United States Patent
Atkin

(10) Patent No.: US 7,251,667 B2
(45) Date of Patent: Jul. 31, 2007

(54) UNICODE INPUT METHOD EDITOR

(75) Inventor: Steven Edward Atkin, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 880 days.

(21) Appl. No.: 10/104,724

(22) Filed: Mar. 21, 2002

(65) Prior Publication Data

US 2003/0182103 A1 Sep. 25, 2003

(51) Int. Cl.
G06F 7/00 (2006.01)
G06F 17/00 (2006.01)

(52) U.S. Cl. .................................... 707/104.1; 707/101
(58) Field of Classification Search ................ 715/535, 715/531, 540; 707/100, 102, 104.1, 101; 345/173, 171
See application file for complete search history.

(56) References Cited

U.S. PATENT DOCUMENTS

| | | | | |
|---|---|---|---|---|
| 5,758,314 | A | 5/1998 | McKenna | 704/8 |
| 6,003,050 | A * | 12/1999 | Silver et al. | 715/536 |
| 6,035,119 | A | 3/2000 | Massena et al. | 717/1 |
| 6,272,631 | B1 | 8/2001 | Thomlinson et al. | 713/155 |
| 6,281,886 | B1 * | 8/2001 | Ranieri | 345/173 |
| 6,292,770 | B1 | 9/2001 | Zerber | 704/8 |
| 6,298,354 | B1 | 10/2001 | Saulpaugh et al. | 707/103 |
| 2004/0230908 | A1 * | 11/2004 | Atkin et al. | 715/535 |

FOREIGN PATENT DOCUMENTS

JP 2000-276339 A 10/2000

WO WO 98/44411 A1 10/1998

OTHER PUBLICATIONS

Yong et al., "Computer Networks and ISDN Systems", vol. 30, Issue 17, pp. 271-279; Apr. 1998.*
Mckenna, "Multilingual Databases and Global Internet Integration".*
Lo et al, "Cross Platform CJK Input Method Engine", IEEE SMC, 2002.*
Yong et al., "Java Input Method Engine", Computer Networks and ISDN Systems, vol. 30, Issue 1-7, pp. 271-279; Apr. 1998.*
CALICO '93 Annual Symposium. Computer Assisted Learning and Instruction Consortium 1993 Annual Symposium on 'Assessment'. pp. 130-131.
Web Techniques; Jul. 1997; v.2, # 7, pp. 30,32-36.
IBM Dossier No. STL919990063; Yaung, At, et al.; "Method and System for Efficiently Handling Unicode Inout for Java GUI-Based Programs"; Oct. 8, 1999.
IBM Dossier No. STL920000055; Ehrman, John; "Method of, System for, and Computer Program Product for Creating and Converting to Unicode Data"; Jul. 10, 2000.
IBM Dossier No. STL920000068; Ehrman, John; "Data Structure for Creating, Scoping, and Converting to Unicode Data"; Jul. 10, 2000.

* cited by examiner

Primary Examiner—Jeffrey Gaffin
Assistant Examiner—Michael J Hicks
(74) Attorney, Agent, or Firm—Libby Z. Handelsman; John R. Biggers; Biggers & Ohanian, LLP

(57) ABSTRACT

A method for converting to Unicode, in a Java Input Method Editor ("IME"), the encoding formats of a character code unit, including selecting an encoding format, receiving, through a computer user interface, in an IME, at least one character code unit having the encoding format and an encoding base, and displaying the character code unit through the computer user interface. Embodiments also include converting the encoding format of the character code unit to Unicode, thereby creating a Unicode code point, displaying, through the computer user interface, a glyph corresponding to the Unicode code point, and transferring the Unicode code point to an application.

21 Claims, 7 Drawing Sheets

Numeric Code Values
For Several Example English Characters
In Several Example Encoding Formats

| Characters | Encoding Formats | | | | | | | |
|---|---|---|---|---|---|---|---|---|
| | ASCII | | EBCDIC | | Baudot | | Unicode | |
| | Dec | Hex | Dec | Hex | Dec | Hex | Dec | Hex |
| A | 65 | 41 | 193 | C1 | 24 | 18 | 65 | 41 |
| B | 66 | 42 | 194 | C2 | 19 | 13 | 66 | 42 |
| C | 67 | 43 | 195 | C3 | 14 | E | 67 | 43 |
| D | 68 | 44 | 196 | C4 | 18 | 12 | 68 | 44 |
| E | 69 | 45 | 197 | C5 | 16 | 10 | 69 | 45 |
| F | 70 | 46 | 198 | C6 | 22 | 16 | 70 | 46 |

Figure 2

UNICODE INPUT METHOD EDITOR

BACKGROUND OF THE INVENTION

1. Field of the Invention

The field of the invention is data processing, or, more specifically, methods, systems, and products for converting byte sequences in IMEs into Unicode code points.

2. Description Of Related Art

"Unicode" is standard encoding format for characters. Computers internally operate only with numbers. Computers store letters and other characters by assigning a number for each character. Before Unicode was invented, there were hundreds of different encoding systems for assigning these numbers. One example of a well known encoding system is the American Standard Code for Information Interchange, known as 'ASCII.' Another well known encoding system is the IBM system known as the Extended Binary-Coded Decimal Interchange Code, or 'EBCDIC.' Other encoding formats include the CCITT encoding system, of the Comite Consultatif International Telephonique et Telegraphique, and the International Standard Organization system known as 'ISO 8859-1.'

No single encoding system, or encoding format, however, could contain enough characters. The European Union, for example, alone requires several different encodings to cover all its languages. Even for a single language like English no single encoding was adequate for all the letters, punctuation, and technical symbols in common use. In addition, these encoding systems also conflict with one another. That is, two encodings can use the same number for two different characters or use different numbers for the same character. Unicode provides a unique encoding number for every character, independent of the platform, independent of the program, independent of the language.

Unicode is an encoding system, or encoding format, for characters. Roughly speaking, characters represent indivisible marks that people use in writing systems to convey information. In western alphabets, for example, the Latin small letter 'a' is the name of a character. Characters encoded by Unicode include, not only marks used in writing, but also formatting marks, control characters, and characters usually combined with other characters such as diacritical marks or vowel marks. Formatting marks give an indication of how adjacent characters are to be rendered but do not themselves correspond to what one ordinarily thinks of as a written mark. Control characters have meaning in computing but do not correspond to written marks.

A Unicode "code point" is a numeric value assigned to a character. In the Unicode encoding format, each character receives a unique Unicode code point. Unicode code points have values in the hexadecimal range 000000 to 10FFFF, requiring therefore 21 bits of computer storage for a single Unicode code point. Computers tend to administer computer storage in terms of 8-bit bytes, so it is well to explain a little further how Unicode code points are encoded.

There are three kinds of Unicode encoding formats defined in standards commonly known as UTF-8, UTF-16, and UTF-32. UTF-8 represents Unicode code points in "code units" of 8 bits. UTF-16 represents Unicode code points in code units of 16 bits. UTF-32 represents Unicode code points in code units of 32 bits. In UTF-32, therefore, each Unicode code point is stored in a single code unit. For emphasis and clarity, in this specification, "code units" are often referred to as "character code units."

For UTF-8 and UTF-16, however, a Unicode representation of a character requires both at least one code unit, often more than one, and a rule describing a mapping between sequences of code units and Unicode code points. More particularly, In UTF-8, code points in the range hexadecimal 0000 through 007F are stored in a single code unit (one byte). Other code points in UTF-8 are represented by a sequence of two or more code units, each byte in the range 0000 through 00FF. In UTF-16, code points in the range hexadecimal 0000 through FFFF are stored in a single 16-bit code unit. Other code points in UTF-16 are represented by a pair of surrogates, each stored in one code unit.

The single code unit mapping in UTF-8, hex 00 through 7F, correspond to the original 128 values of traditional ASCII and in fact have generally the same values as ASCII code, a historical accident. Although UTF-32 is the modem powerful standard of Unicode, it is probably worthwhile to point out that UTF-16 is almost identical in representational power with UTF-32, because, as a practical matter, the frequency of characters with code points larger than hexadecimal FFFF is small. Readers interested in more detail regarding Unicode or multi-code unit Unicode encodings are directed to the book that sets forth the current standard, "The Unicode Standard, Version 3.0," ISBN 0-201-61633-5, by the Unicode Consortium, and to the Unicode Consortium's website at http://www.unicode.org.

By use of Unicode, Java supports multilingual applications. Java uses Unicode for storage of character data. Developers can create single binary applications that provide basic enablement for a wide variety of scripts, Latin, Greek, Japanese, Korean, Chinese, and so on.

Java Input Methods Editors ("IMEs") are software components that interpret user operations such as typing keys, speaking, or writing using a pen device to generate text input for applications. The most common input methods are the ones that let users type text in Chinese, Japanese, or Korean, languages that use thousands of different characters, on a regular-sized keyboard. The text is typed in a form that can be handled by regular-sized keyboards, for example, in a Romanized form, and then converted into the intended form. Typically a sequence of several characters needs to be typed and then converted in one group, and conversion may have to be retried because there maybe several possible translations.

While this "composition" process is going on, the text, not having been officially handed off to the application, still logically belongs to the IME, but nevertheless needs to be displayed to the user. A "Java Input Method Framework" or "IMF" cooperates with an IME to provide at least two ways to display composition to a user. The IMF enables text editing components to display text in the context of the document that it will eventually belong to, but in a style, such as highlighted or underscored, that indicates that the text still needs to be converted or confirmed by the IME. This is called "on-the-spot editing."

An IMF also provides a separate alternative window to display text for applications not equipped to deal with the text until it is confirmed and officially handed over to the application. This second approach is called "root-window editing." Readers interested in more detail regarding Java IMEs are directed to the "Input Method Framework Design Specification" published by Sun Microsystems, Inc., at http://java.sun.com/products/jdk/1.2/docs/guide/intl/spec.html.

Usefulness of IMEs in software development environments, however, is not without difficulties. There are few tools for verifying that a Java application correctly handles arbitrary Unicode character data. It is typical in Java development environments for a developer or a tester to be required to establish a national language environment, for example, in a Japanese version of Windows, in order to ascertain whether an application supports a particular script. Discovery of enablement problems therefore are delayed until translation verification testing or system verification testing. In addition, enablement problems are difficult to debug because developers must have the correct national language environment in order to reproduce problems. Moreover, some Unicode characters are not available on standard keyboard layouts, although at least some Unicode characters are significant for legacy purposes and data interchange.

It would be advantageous to have a Java IME capable of providing testers, developers, and users with a mechanism for entering Unicode characters into Java applications, any Java application, independent of any underlying national language environment in the operating system of the computer on which the Java application is installed and independent of any particular keyboard layout. Such an IME would assist in identification of enablement problems early in the software development cycle and provide a useful mechanism for recreating enablement problems.

SUMMARY OF THE INVENTION

Exemplary embodiments of the invention typically include methods for converting to Unicode, in a Java Input Method Editor ("IME"), the encoding formats of character code units. Embodiments typically include selecting an encoding format, receiving, through a computer user interface, in an IME, at least one character code unit having the encoding format and an encoding base, and displaying the character code unit through the computer user interface. Embodiments typically include converting the encoding format of the character code unit to Unicode, thereby creating a Unicode code point, and displaying, through the computer user interface, a glyph corresponding to the Unicode code point. Embodiments typically include transferring the Unicode code point to an application.

Exemplary embodiments of the invention typically include repeating at least once the steps of selecting an encoding format, receiving at least one character code unit, displaying the character code unit, converting the encoding format to Unicode, displaying a glyph, and transferring the Unicode code point, whereby a user is enabled during a single editing session to mix characters among many encoding formats independent of the language environment of the native operating system and independent of the encoding format underlying the computer user interface. Some embodiments typically include storing in a buffer an encoding format control code identifying the encoding format, and converting to hexadecimal the encoding base of the character code unit, in which the converting to hexadecimal is carried out in dependence upon the encoding base, thereby yielding a hexadecimal code unit. Such embodiments typically include storing the hexadecimal code unit in the buffer, and repeating at least once the steps of selecting an encoding format, storing an encoding format control code, receiving at least one character code unit, displaying the character code unit, converting to hexadecimal, and storing the hexadecimal code unit in the buffer, whereby is created in the buffer a sequence of hexadecimal code units originating from a multiplicity of encoding formats.

In exemplary embodiments, converting the encoding format typically includes converting to Unicode the encoding format of all the hexadecimal code units in the buffer, thereby creating a multiplicity of Unicode code points. In such embodiments, displaying a glyph typically includes displaying glyphs for the multiplicity of Unicode code points. In such embodiments, transferring to an application typically includes transferring the multiplicity of Unicode code points to an application.

In exemplary embodiments, converting the encoding format to Unicode typically includes selecting a conversion algorithm in dependence upon the encoding format and applying the algorithm to the character code unit. In such embodiments, the encoding format itself is Unicode and applying the algorithm typically includes writing the Unicode code point to a Unicode output buffer. In exemplary embodiments, the encoding format typically includes a non-Unicode encoding format having one-to-one correspondence with Unicode. Such embodiments include converting to hexadecimal the encoding base of the character code unit, in which the converting to hexadecimal is carried out in dependence upon the encoding base, thereby yielding a hexadecimal code unit. In such embodiments, applying the algorithm typically includes retrieving a Unicode value from a conversion table in dependence upon the value of the hexadecimal code unit.

In typical embodiments of the invention, the encoding format includes a multi-code unit, non-Unicode encoding format. Such embodiments typically include converting to hexadecimal the encoding base of the character code unit, in which the converting to hexadecimal is carried out in dependence upon the encoding base, thereby yielding a hexadecimal code unit. In such embodiments, applying the algorithm typically includes calling, with the hexadecimal code unit as a parameter, a converter member method in a JAVA API.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

BRIEF DESCRIPTION OF THE DRAWINGS

FIG. 2 is a table showing examples of numeric code values for several English characters in several encoding formats.

DETAILED DESCRIPTION OF EXEMPLARY EMBODIMENTS

Introduction

The present invention is described to a large extent in this specification in terms of methods for converting byte sequences in IMEs into Unicode code points. Persons skilled in the art, however, will recognize that any computer system that includes suitable programming means for operating in accordance with the disclosed methods also falls well within the scope of the present invention.

Suitable programming means include any means for directing a computer system to execute the steps of the method of the invention, including for example, systems comprised of processing units and arithmetic-logic circuits coupled to computer memory, which systems have the capability of storing in computer memory, which computer memory includes electronic circuits configured to store data and program instructions, programmed steps of the method of the invention for execution by a processing unit. The invention also may be embodied in a computer program product, such as a diskette or other recording medium, for use with any suitable data processing system.

Embodiments of a computer program product may be implemented by use of any recording medium for machine-readable information, including magnetic media, optical media, or other suitable media. Persons skilled in the art will immediately recognize that any computer system having suitable programming means will be capable of executing the steps of the method of the invention as embodied in a program product. Persons skilled in the art will recognize immediately that, although most of the exemplary embodiments described in this specification are oriented to software installed and executing on computer hardware, nevertheless, alternative embodiments implemented as firmware or as hardware are well within the scope of the present invention.

DETAILED DESCRIPTION

Figure 1:
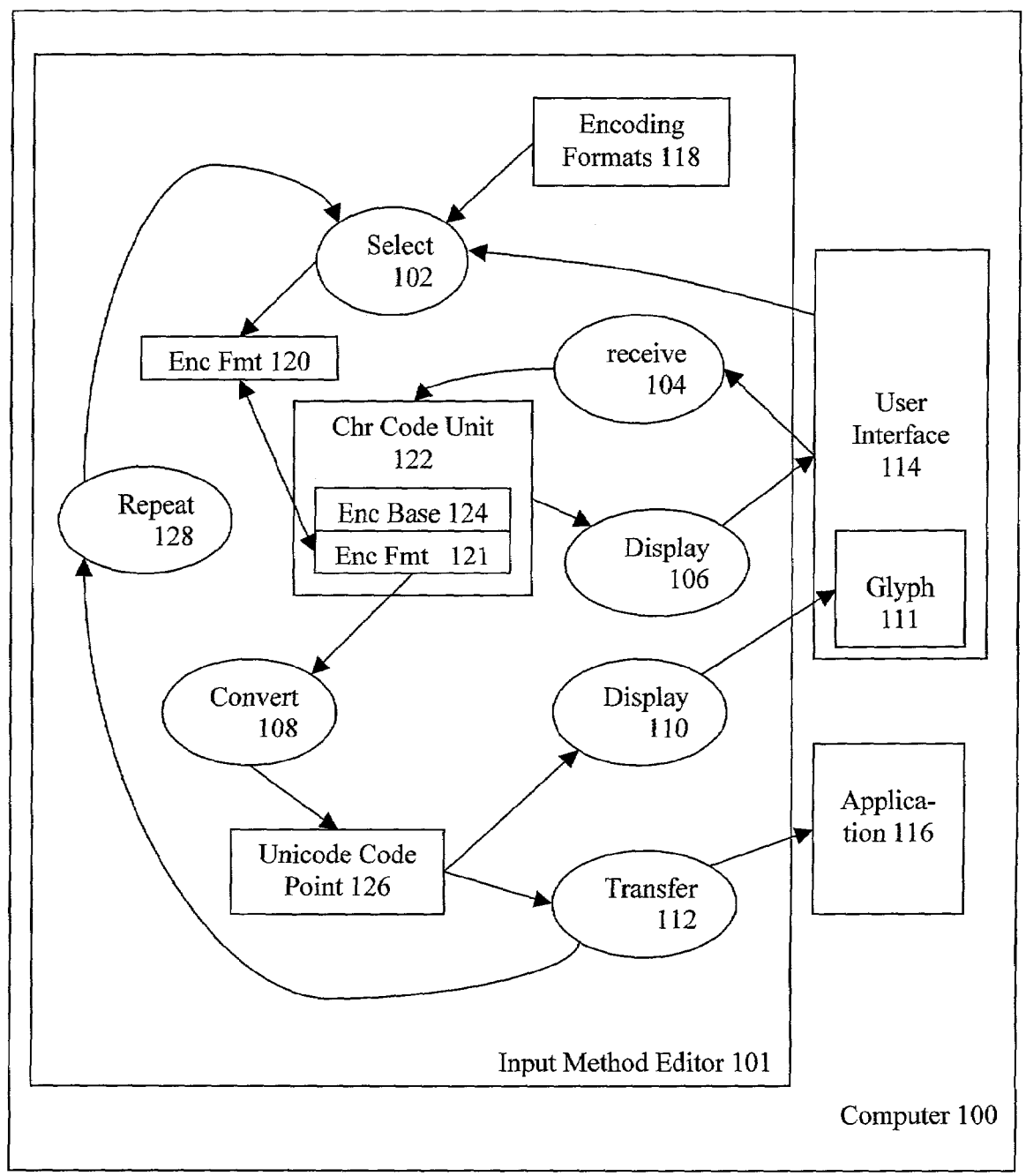
FIG. 1 is a control flow diagram of an exemplary embodiment of the present invention as a method for converting to Unicode, in a Java IME, the encoding formats of character code units.

Turning now to FIG. 1, an exemplary embodiment of the invention is shown as a method for converting to Unicode, in a Java Input Method Editor, or "IME," the encoding formats of character code units. Embodiments of the kind shown in FIG. 1 typically include selecting (102) an encoding format (120). Typical embodiments include a repository of supported encoding formats (118) supporting user interface displays of selection lists, pull down menus, GUI radio buttons, and the like, for a user to choose among. There are typically many supported encoding formats such as ASCII, EBCDIC, Baudot, and so on.

Such embodiments typically include receiving (104), through a computer user interface (114), in an IME (101), at least one character code unit (122) having the encoding format (121) and an encoding base (124). The receiving (104) includes receiving at least one character code unit, first, because encoding Unicode code points in the UTF-8 and UTF-16 versions of Unicode sometimes requires more than one code unit, and, second, because a user can simply decide to enter many code units, for example, for the purpose of entering more than one character at a time.

Embodiments according to FIG. 1 typically include displaying (106) the character code unit (122) through the computer user interface (114). This step is in support of the composition process in IME operation. The display is through the user interface of the application if the application accepts on-the-spot editing Otherwise, the display is through a root window. What is displayed at this step is a representation of the raw entered code units, bytes of data, in the encoding format as entered by a user and received in the IME. More specifically, for example, if the encoding format is ASCII and the encoding base is decimal, then to enter an 'A,' the user types '65,' the decimal ASCII code for 'A,' and the display function (106) displays '65.' For a character code unit representing 'A' entered in the EBCDIC encoding format in the hexadecimal encoding base, a user types in hexadecimal 'C1,' the receive function (104) receives a character code unit of hex C1, and the display function (106) displays hexadecimal 'C2.'

The table (218) in FIG. 2 illustrates encoding values for the first few characters (202) in the English alphabet in three example encoding formats, ASCII, EBCDIC, Baudot, as well as the corresponding Unicode values. Each encoding formats is shown with two encoding bases, decimal (204, 208, 212) and hexadecimal (206, 210, 214) for ASCII, EBCDIC, and Baudot respectively. The number of supported encoding formats is much larger than three, but these three are examples. We include a decimal column (216) for the Unicode values, despite the fact that encodings in Unicode are hexadecimal, to point out that users are enabled in typical embodiments of the present invention to enter characters even in the Unicode encoding format in the decimal encoding base, so that such characters as character code units are received (104), displayed (106) in decimal, and, as described in more detail below, converted to regular hexadecimal Unicode in the due course of processing as carried out in typical embodiments of the present invention.

Turning again to FIG. 1, in fact, embodiments of the kind illustrated are shown to include converting (108) the encoding format (121) of the character code unit (122) to Unicode, thereby creating a Unicode code point (126). Such embodiments typically include displaying (110), through the computer user interface (114), a glyph (111) corresponding to the Unicode code point (126). More specifically, a "glyph," as the term is used in this specification, is a visual representation of a character numerically encoded in Unicode. That is, a glyph is the actual writing mark normally associated with a character, as, for example, the glyph 'B,' which is the writing mark or glyph represented in Unicode by the numeric encoding value hexadecimal 0042. Again, some embodiments support display of glyphs on-the-spot through an application's user interface, and other embodiment display glyphs at this stage through a root window.

Such embodiments include transferring (112) the Unicode code point (126) to an application (116). This transferring (112) is the 'official' commitment of the Unicode code points to the application. This transferring (112) occurs transparently for root window embodiments using root windows because the application simply receives the final Unicode code points for display without knowing anything about the IME editing process. For embodiments that support on-the-spot editing, this transferring (112) is a transfer of official ownership of the Unicode code points from the IME to the application.

Further embodiments according to FIG. 1 include repeating (128) at least once the steps of selecting (102) an encoding format, receiving (104) at least one character code unit, displaying (106) the character code unit, converting (198) the encoding format to Unicode, displaying (110) a glyph, and transferring (112) the Unicode code point. In this way, a user is enabled during a single editing session to mix characters among many encoding formats independent of the language environment of the native operating system and independent of the encoding format underlying the computer user interface. That is, by repeatedly changing the encoding format during an editing session, a user of embodiments of this kind mixes characters among many encoding formats in a single output stream to a single application using a single IME, a very powerful benefit for software development work.

Figure 3:
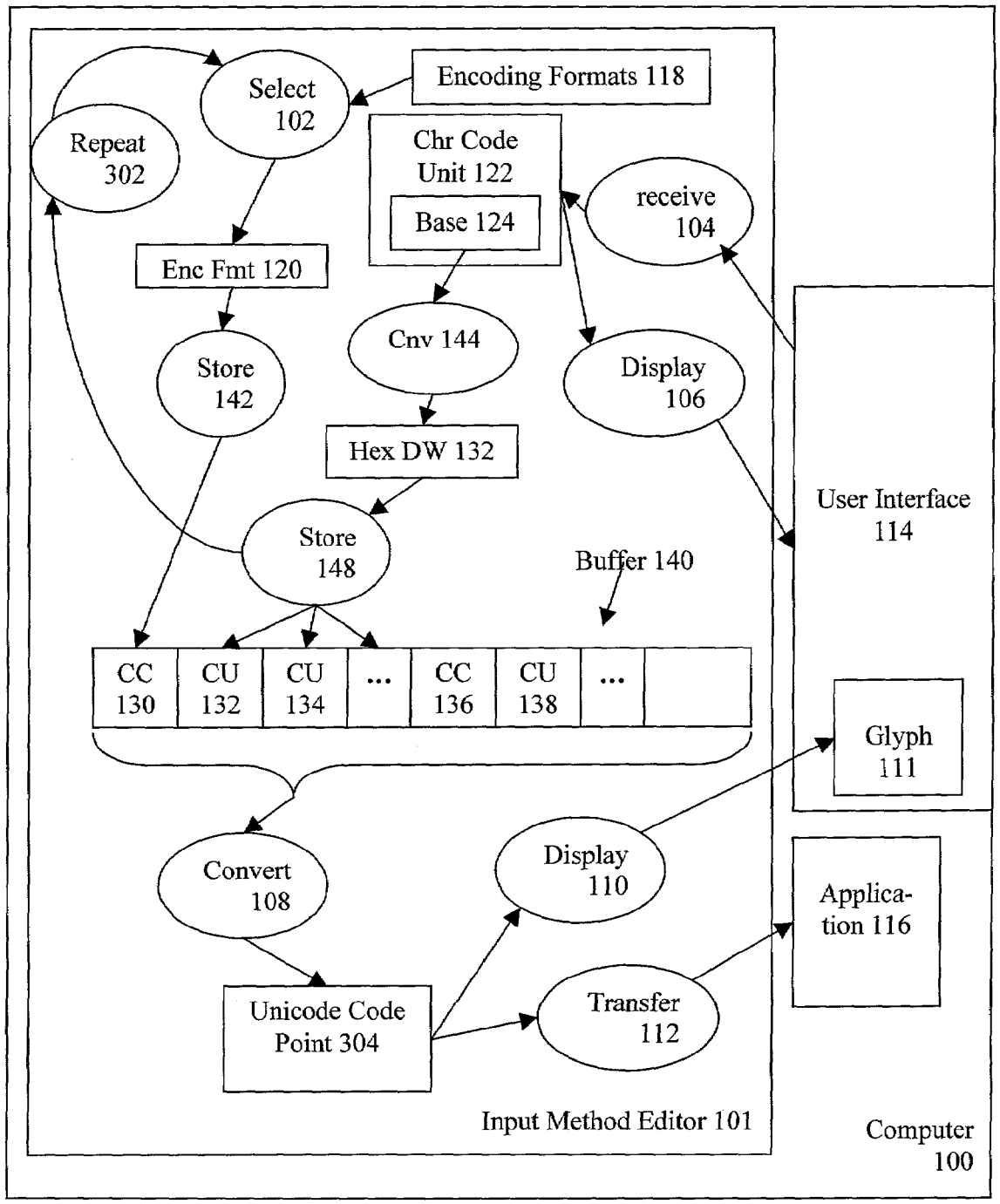
FIG. 3 is a control flow diagram of an exemplary embodiment of the present invention that repetitively creates a buffer entries of control codes and data words.

Turning now to FIG. 3, a further exemplary embodiment of the invention is shown to include storing (142) in a buffer (140) an encoding format control code (130) identifying the encoding format (120), converting (144) to hexadecimal the encoding base (124) of the character code unit (122), in which the converting to hexadecimal is carried out in dependence upon the encoding base, thereby yielding a hexadecimal code unit (132), and storing (148) the hexadecimal code unit in the buffer. Embodiments of this kind often include repeating (302) at least once the steps of selecting (102) an encoding format, storing (142) an encoding format control code, receiving (104) at least one character code unit, displaying (106) the character code unit, converting (144) to hexadecimal, and storing (148) the hexadecimal code unit in the buffer. By repeating these steps, an IME enables a user to create in the buffer a sequence of hexadecimal code units originating from a multiplicity of encoding formats. In such embodiments, converting (108) the encoding format typically includes converting to Unicode the encoding format of all the hexadecimal code units (132, 134, 138) in the buffer (140), thereby creating a multiplicity of Unicode code points (304). In embodiments of this king, displaying (110) a glyph typically includes displaying glyphs for the multiplicity of Unicode code points, and transferring (112) to an application typically includes transferring the multiplicity of Unicode code points to an application.

More specifically, consider a use case in which a user selects (102) the ASCII encoding format. An encoding format control code (130) for ASCII is entered in the buffer (140). The user then enters several character code units which are converted to hex and stored in the buffer (132, 134). The use then selects another encoding format (102), EBCDIC, for example, for which a new encoding format control code (136) is stored in the buffer, and the user continues by entering character code units in EBCDIC, which are stored in the buffer (140) beginning at location (138). The user continues in this fashion, creating buffer contents comprising an encoding format control code identifying an encoding format followed by one or more hexadecimal code units in that format followed by a second encoding format control code identifying a second encoding format followed by one or more hexadecimal code units in that second encoding format followed by a third encoding format control code identifying a third encoding format followed by one or more hexadecimal code units in that third encoding format, and so on, up to the storage limits of the buffer.

In such embodiments, the process for conversion (108) of the buffer contents to Unicode changes its internal processing algorithm in dependence upon the encoding format control codes. That is, the conversion routine (108) scans the buffer and, upon encountering an encoding format control code (130, 136) for EBCDIC, the conversion routine (108) changes to EBCDIC-to-Unicode conversion. Upon encountering an encoding format control code (130, 136) for Baudot, the conversion routine (108) changes to Baudot-to-Unicode conversion. And so on, for all supported encoding formats in any particular embodiment.

Figure 4:
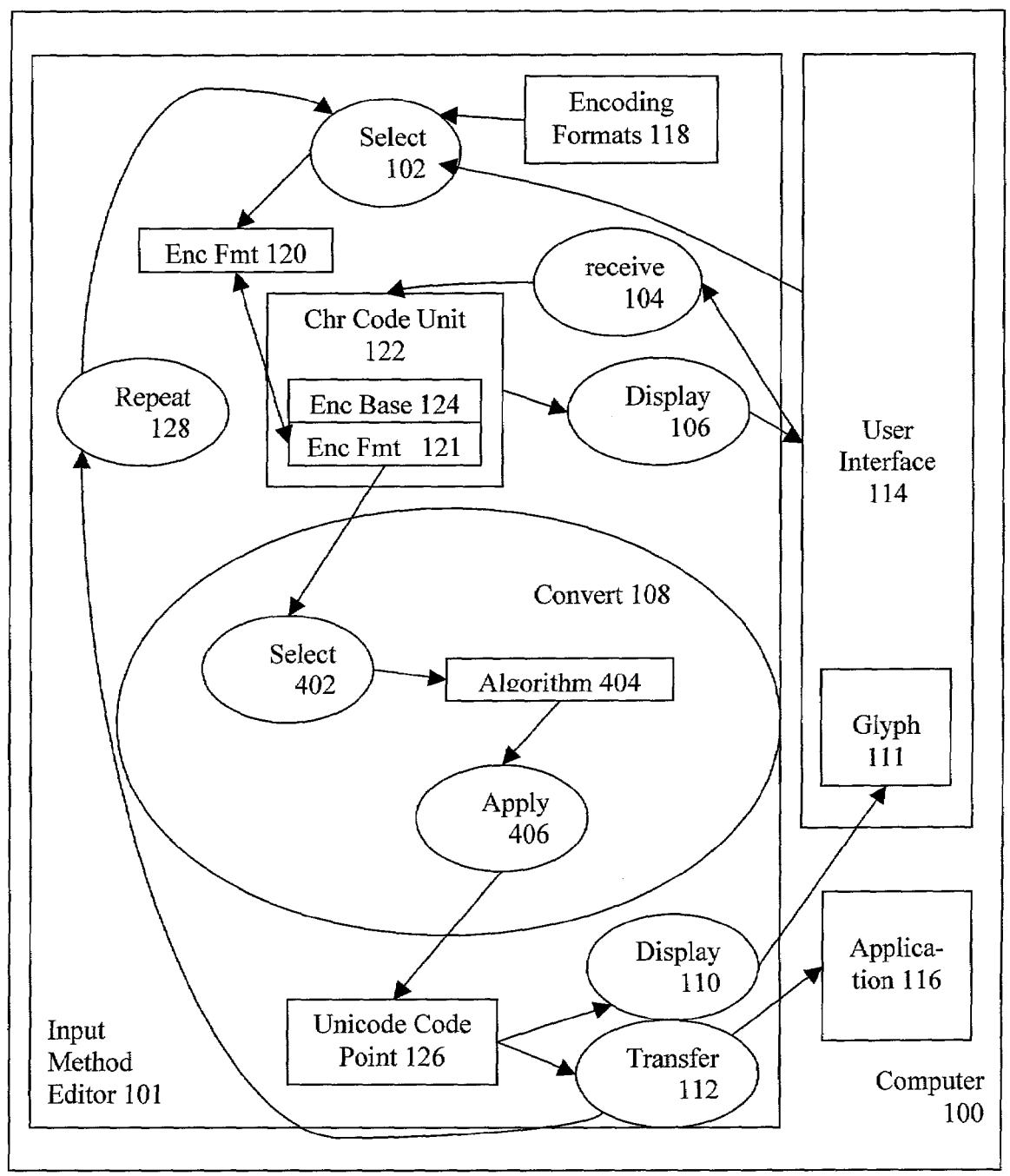
FIG. 4 is a control flow diagram of a further exemplary embodiment of the present invention in which converting to Unicode includes selecting and applying an algorithm.
Figure 5:
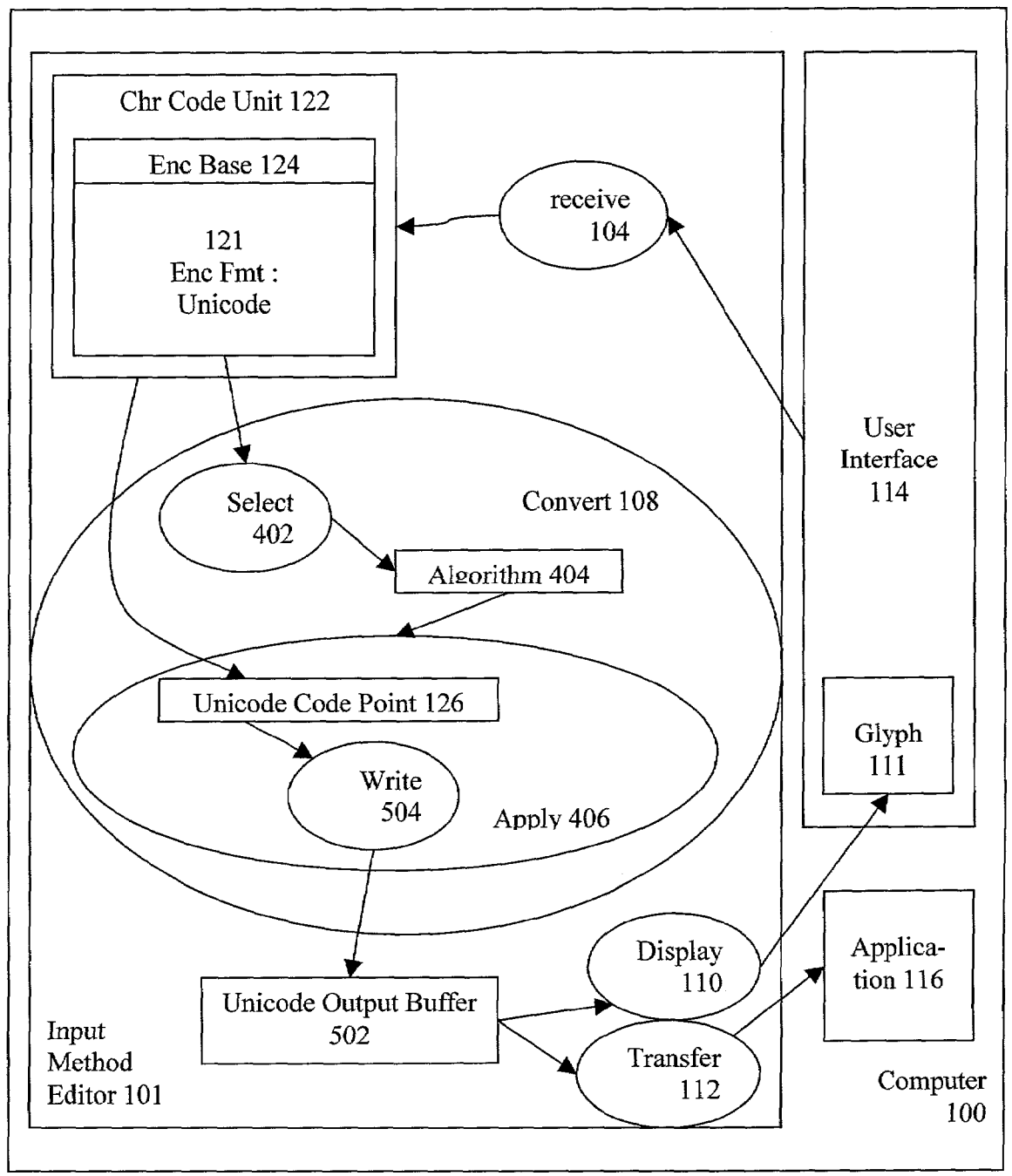
FIG. 5 is a control flow diagram of a further exemplary embodiment of the present invention in which applying an algorithm includes writing a Unicode code point directly to a Unicode output buffer.

Turning now to FIG. 4, a further exemplary embodiment is shown in which converting the encoding format to Unicode (108) includes selecting (402) a conversion algorithm (404) in dependence upon the encoding format (121) and applying (406) the algorithm to the character code unit (122). In embodiments of the kind illustrated in FIG. 5, the encoding format (121) itself is Unicode and applying (406) the algorithm typically includes writing (504) a Unicode code point (126) to a Unicode output buffer (502).

Figure 6:
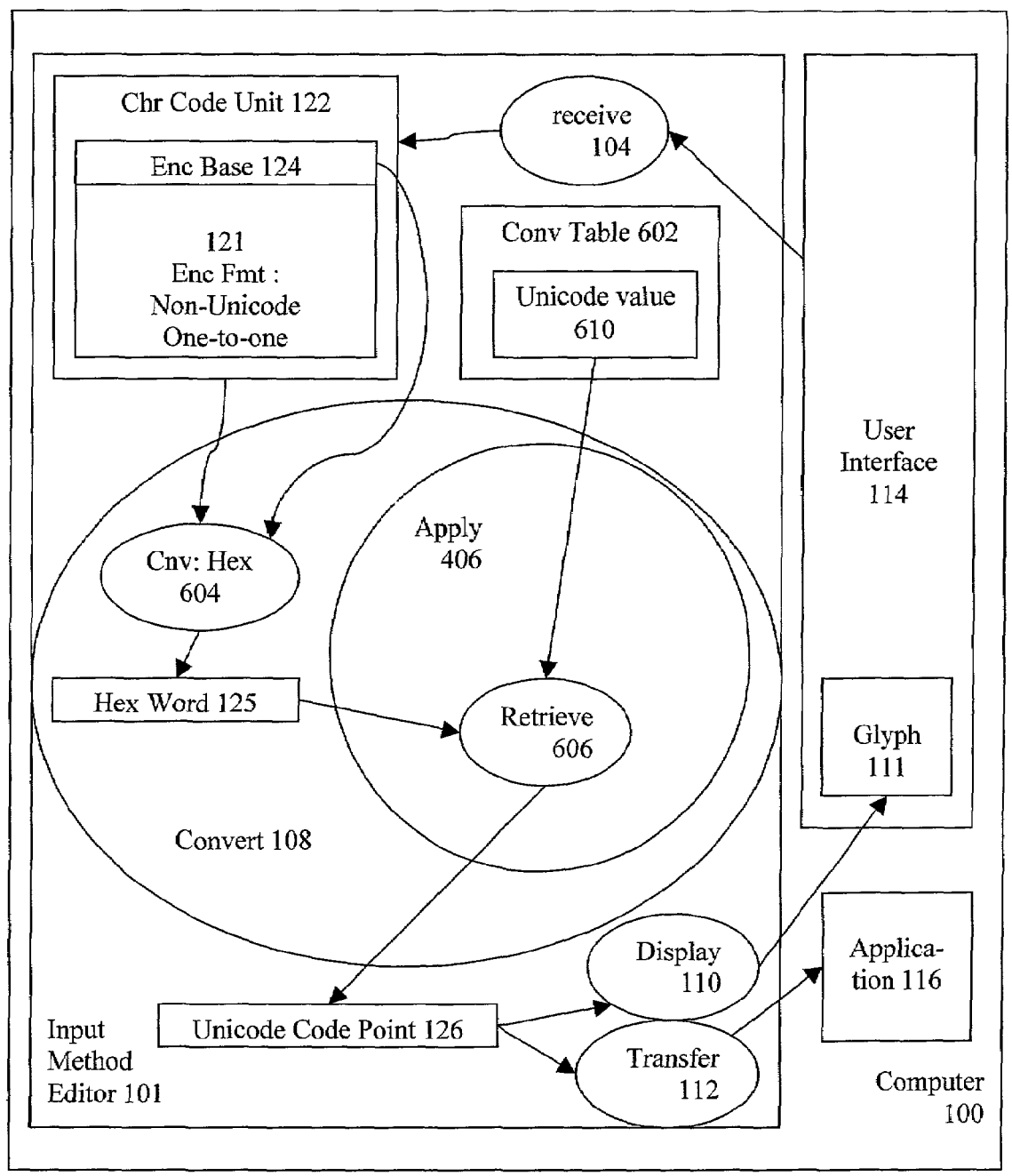
FIG. 6 is a control flow diagram of a further exemplary embodiment of the present invention in which applying an algorithm includes retrieving a Unicode value from a conversion table.

In FIG. 6, a further exemplary embodiment is shown in which the encoding format (121) includes a non-Unicode encoding format having one-to-one correspondence with Unicode. Such embodiments typically include converting (604) to hexadecimal the encoding base (124) of the character code unit (122), in which the converting (604) to hexadecimal is carried out in dependence upon the encoding base (124), thereby yielding a hexadecimal code unit (125). In such embodiments, applying (406) the algorithm typically includes retrieving (606) a Unicode value (610) from a conversion table (602) in dependence upon the value of the hexadecimal code unit (125). Converting (604) to hexadecimal in such embodiments is dependent upon the encoding base in the sense that selection of the conversion table, or selection of appropriate columns in a conversion table depends upon the encoding base, selecting different tables or columns, for example, for conversion from EBCDIC-to-Unicode and for Baudot-to-Unicode.

Figure 7:
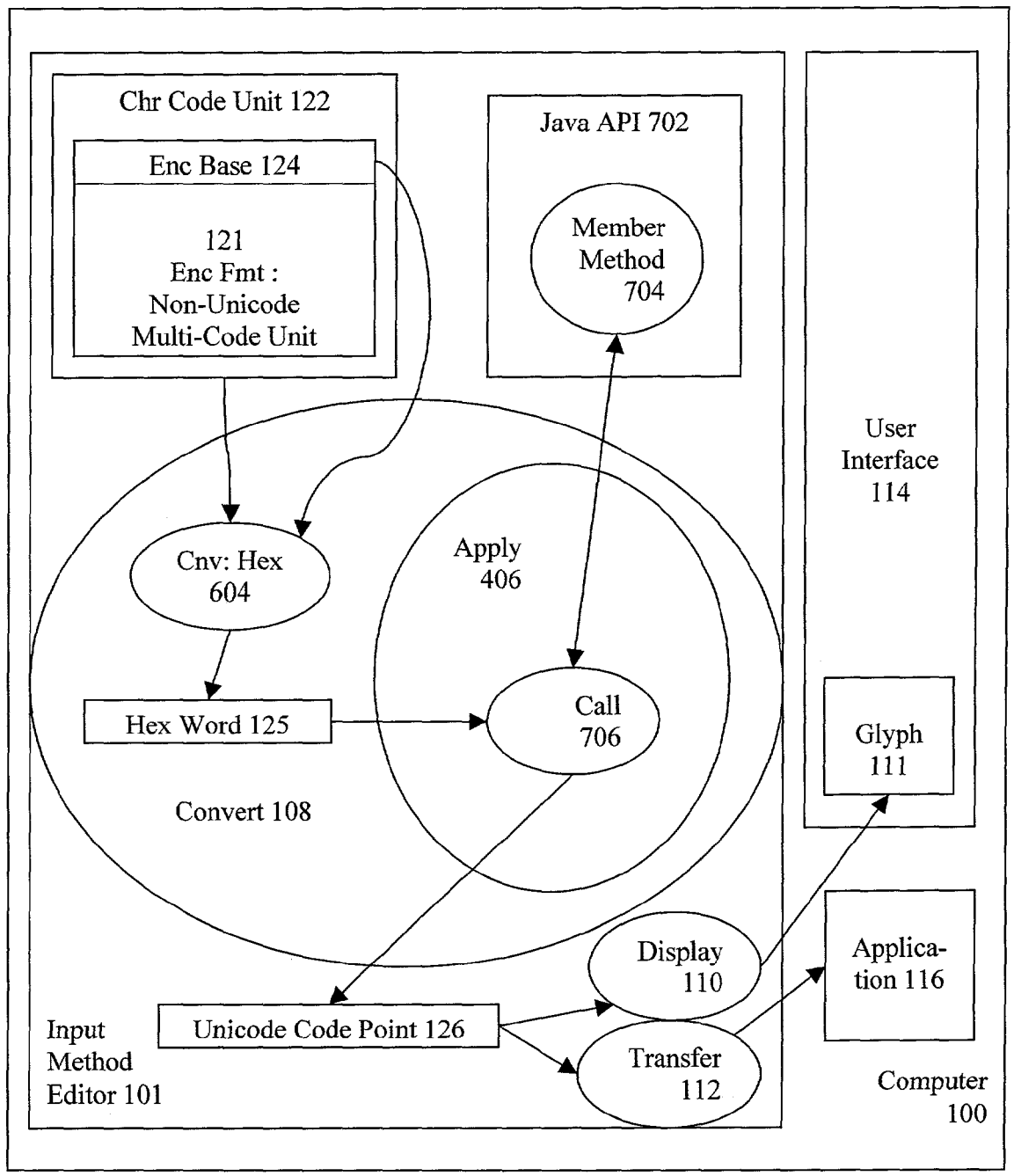
FIG. 7 is a control flow diagram of a further exemplary embodiment of the present invention in which applying an algorithm includes calling a member method in a Java API.

In FIG. 7, a further exemplary embodiment is shown in which the encoding format (121) includes a multi-code unit, non-Unicode encoding format. Multi-code encoding formats include any encoding format in which the number of characters to be encoded exceeds the number of characters that can be encoded by one code unit. For example, any 8-bit encoding for Chinese or Japanese is a multi-code unit encoding format, because Chinese and Japanese have thousands of characters to be represented, but only 256 characters can be represented with an 8-bit encoding.

Embodiments of the kind shown in FIG. 7 typically include converting (604) to hexadecimal the encoding base (124) of the character code unit (122), in which the converting (604) to hexadecimal is carried out in dependence upon the encoding base (124), thereby yielding a hexadecimal code unit (125). In such embodiments, applying (406) the algorithm typically includes calling (706), with the hexadecimal code unit (125) as a parameter, a converter member method (704) in a JAVA API (702). More specifically, such conversions typically comprise calling a converter member method in the Java class known as sun.io.ByteToCharConverter. The member method returns a Unicode code point (126).

It will be understood from the foregoing description that various modifications and changes may be made, and in fact will be made, in the exemplary embodiments of the present invention without departing from its true spirit. The descriptions in this specification are for purposes of illustration only and are not to be construed in a limiting sense. The scope of the present invention is limited only by the language of the following claims.

What is claimed is:

1. A method for converting to Unicode, in a Java Input Method Editor ("IME"), the encoding formats of character code units, the method comprising:

selecting an encoding format;

receiving, through a computer user interface, in the IME, at least one character code unit having the encoding format and an encoding base, wherein the character code unit is a numeric value representing a character;

displaying the character code unit through the computer user interface;

converting the encoding format of the character code unit to Unicode, creating a Unicode code point;

displaying, through the computer user interface, a glyph corresponding to the Unicode code point, wherein the glyph is a visual representation of a character; and transferring the Unicode code point to an application.

2. The method of claim 1 further comprising repeating at least once the steps of selecting an encoding format, receiving at least one character code unit, displaying the character code unit, converting the encoding format to Unicode, displaying a glyph, and transferring the Unicode code point, whereby a user is enabled during a single editing session to mix characters among many encoding formats independent of the language environment of the native operating system and independent of the encoding format underlying the computer user interface.

3. The method of claim 1 further comprising:

storing in a buffer an encoding format control code identifying the encoding format; and converting to hexadecimal the encoding base of the character code unit, wherein the converting to hexadecimal is carried out in dependence upon the encoding base, thereby yielding a hexadecimal code unit;

storing the hexadecimal code unit in the buffer;

repeating at least once the steps of selecting an encoding format, storing an encoding format control code, receiving at least one character code unit, displaying the character code unit, converting to hexadecimal, and storing the hexadecimal code unit in the buffer, whereby is created in the buffer a sequence of hexadecimal code units originating from a multiplicity of encoding formats;

wherein:

converting the encoding format further comprises converting to Unicode the encoding format of all the hexadecimal code units in the buffer, thereby creating a multiplicity of Unicode code points;

displaying a glyph further comprises displaying glyphs for the multiplicity of Unicode code points; and transferring to an application further comprises transferring the multiplicity of Unicode code points to an application.

4. The method of claim 1 wherein converting the encoding format to Unicode comprises selecting a conversion algorithm in dependence upon the encoding format and applying the algorithm to the character code unit.

5. The method of claim 4 wherein the encoding format itself is Unicode and applying the algorithm further comprises writing the Unicode code point to a Unicode output buffer.

6. The method of claim 4 wherein:

the encoding format comprises a non-Unicode encoding format having one-to-one correspondence with Unicode;

the method further comprises converting to hexadecimal the encoding base of the character code unit, wherein the converting to hexadecimal is carried out in dependence upon the encoding base, thereby yielding a hexadecimal code unit; and applying the algorithm further comprises retrieving a Unicode value from a conversion table in dependence upon the value of the hexadecimal code unit.

7. The method of claim 4 wherein:

the encoding format comprises a multi-code unit, non-Unicode encoding format;

the method further comprises converting to hexadecimal the encoding base of the character code unit, wherein the converting to hexadecimal is carried out in dependence upon the encoding base, thereby yielding a hexadecimal code unit; and applying the algorithm further comprises calling, with the hexadecimal code unit as a parameter, a converter member method in a JAVA API.

8. A system for converting to Unicode, in a Java Input Method Editor ("IME"), the encoding formats of character code units, the system comprising:

means for selecting an encoding format;

means for receiving, through a computer user interface, in the IME, at least one character code unit having the encoding format and an encoding base, wherein the character code unit is a numeric value representing a character;

means for displaying the character code unit through the computer user interface;

means for converting the encoding format of the character code unit to Unicode, creating a Unicode code point;

means for displaying, through the computer user interface, a glyph corresponding to the Unicode code point, wherein the glyph is a visual representation of a character; and means for transferring the Unicode code point to an application.

9. The system of claim 8 further comprising means for repeating at least once the steps of selecting an encoding format, receiving at least one character code unit, displaying the character code unit, converting the encoding format to Unicode, displaying a glyph, and transferring the Unicode code point, whereby a user is enabled during a single editing session to mix characters among many encoding formats independent of the language environment of the native operating method and independent of the encoding format underlying the computer user interface.

10. The system of claim 8 further comprising:

means for storing in a buffer an encoding format control code identifying the encoding format; and means for converting to hexadecimal the encoding base of the character code unit, wherein the means for converting to hexadecimal is carried out in dependence upon the encoding base, thereby yielding a hexadecimal code unit;

means for storing the hexadecimal code unit in the buffer;

means for repeating at least once the steps of selecting an encoding format, storing an encoding format control code, receiving at least one character code unit, displaying the character code unit, converting to hexadecimal, and storing the hexadecimal code unit in the buffer, whereby is created in the buffer a sequence of hexadecimal code units originating from a multiplicity of encoding formats;

wherein:

means for converting the encoding format further comprises means for converting to Unicode the encoding format of all the hexadecimal code units in the buffer, thereby creating a multiplicity of Unicode code points;

means for displaying a glyph further comprises means for displaying glyphs for the multiplicity of Unicode code points; and means for transferring to an application further comprises means for transferring the multiplicity of Unicode code points to an application.

11. The system of claim 8 wherein means for converting the encoding format to Unicode comprises means for selecting a conversion algorithm in dependence upon the encoding format and means for applying the algorithm, to the character code unit.

12. The system of claim 11 wherein the encoding format itself is Unicode and means for applying the algorithm further comprises means for writing the Unicode code point to a Unicode output buffer.

13. The system of claim 11 wherein:
the encoding format comprises a non-Unicode encoding format having one-to-one correspondence with Unicode;
the system further comprises means for converting to hexadecimal the encoding base of the character code unit, wherein the means for converting to hexadecimal is carried out in dependence upon the encoding base, thereby yielding a hexadecimal code unit; and
means for applying the algorithm further comprises means for retrieving a Unicode value from a conversion table in dependence upon the value of the hexadecimal code unit.

14. The system of claim 11 wherein:
the encoding format comprises a multi -code unit, non-Unicode encoding format;
the system further comprises means for converting to hexadecimal the encoding base of the character code unit, wherein the means for converting to hexadecimal is carried out in dependence upon the encoding base, thereby yielding a hexadecimal code unit; and
means for applying the algorithm further comprises means for calling, with the hexadecimal code unit as a parameter, a converter member method in a JAVA API.

15. A computer program product stored on a computer readable recording medium for converting to Unicode, in a Java Input Method Editor ("IME"), the encoding formats of character code units, the computer program product comprising:
means, recorded on the recording medium, for selecting an encoding format;
means, recorded on the recording medium, for receiving, through a computer user interface, in the IME, at least one character code unit having the encoding format and an encoding base, wherein the character code unit is a numeric value representing a character;
means, recorded on the recording medium, for displaying the character code unit through the computer user interface;
means, recorded on the recording medium, for converting the encoding format of the character code unit to Unicode, creating a Unicode code point;
means, recorded on the recording medium, for displaying, through the computer user interface, a glyph corresponding to the Unicode code point, wherein the glyph is a visual representation of a character; and
means, recorded on the recording medium, for transferring the Unicode code point to an application.

16. The computer program product of claim 15 further comprising means, recorded on the recording medium, for repeating at least once the steps of selecting an encoding format, receiving at least one character code unit, displaying the character code unit, converting the encoding format to Unicode, displaying a glyph, and transferring the Unicode code point, whereby a user is enabled during a single editing session to mix characters among many encoding formats independent of the language environment of the native operating method and independent of the encoding format underlying the computer user interface.

17. The computer program product of claim 15 further comprising:
means, recorded on the recording medium, for storing in a buffer an encoding format control code identifying the encoding format; and
means, recorded on the recording medium, for converting to hexadecimal the encoding base of the character code unit, wherein the means, recorded on the recording medium, for converting to hexadecimal is carried out in dependence upon the encoding base, thereby yielding a hexadecimal code unit;
means, recorded on the recording medium, for storing the hexadecimal code unit in the buffer;
means, recorded on the recording medium, for repeating at least once the steps of selecting an encoding format, storing an encoding format control code, receiving at least one character code unit, displaying the character code unit, converting to hexadecimal, and storing the hexadecimal code unit in the buffer, whereby is created in the buffer a sequence of hexadecimal code units originating from a multiplicity of encoding formats;
wherein:
means, recorded on the recording medium, for converting the encoding format further comprises means. Recorded on the recording medium, for converting to Unicode the encoding format of all the hexadecimal code units in the buffer, thereby creating a multiplicity of Unicode code points;
means, recorded on the recording medium, for displaying a glyph further comprises means, recorded on the recording medium, for displaying glyphs for the multiplicity of Unicode code points; and
means, recorded on the recording medium, for transferring to an application further comprises means, recorded on the recording medium, for transferring the multiplicity of Unicode code points to an application.

18. The computer program product of claim 15 wherein means, recorded on the recording medium, for converting the encoding format to Unicode comprises means, recorded on the recording medium, for selecting a conversion algorithm in dependence upon the encoding format and means, recorded on the recording medium, for applying the algorithm to the character code unit.

19. The computer program product of claim 18 wherein the encoding format itself is Unicode and means, recorded on the recording medium,
for applying the algorithm further comprises means, recorded on the recording medium, for writing the Unicode code point to a Unicode output buffer.

20. The computer program product of claim 18 wherein:
the encoding format comprises a non-Unicode encoding format having one-to-one correspondence with Unicode;
the computer program product further comprises means, recorded on the recording medium, for converting to hexadecimal the encoding base of the character code unit, wherein the means, recorded on the recording medium, for converting to hexadecimal is carried out in dependence upon the encoding base, thereby yielding a hexadecimal code unit; and
means, recorded on the recording medium, for applying the algorithm further comprises means, recorded on the recording medium, for retrieving a Unicode value from a conversion table in dependence upon the value of the hexadecimal code unit.

21. The computer program product of claim 18 wherein:

the encoding format comprises a multi-code unit, non-Unicode encoding format;

the computer program product further comprises means, recorded on the recording medium, for converting to hexadecimal the encoding base of the character code unit, wherein the means, recorded on the recording medium, for converting to hexadecimal is carried out in dependence upon the encoding base, thereby yielding a hexadecimal code unit; and means, recorded on the recording medium, for applying the algorithm further comprises means, recorded on the recording medium, for calling, with the hexadecimal code unit as a parameter, a converter member method in a JAVA API.

* * * * *